(12) United States Patent
Hui

(10) Patent No.: US 12,324,518 B2
(45) Date of Patent: Jun. 10, 2025

(54) METHOD OF MANUFACTURING AT LEAST A PORTION OF A SWIVEL GLIDE

(71) Applicant: Virco Mfg. Corporation, Torrance, CA (US)

(72) Inventor: Man F. Hui, Monterey Park, CA (US)

(73) Assignee: Virco Mfg. Corporation, Torrance, CA (US)

( * ) Notice: Subject to any disclaimer, the term of this patent is extended or adjusted under 35 U.S.C. 154(b) by 0 days.

(21) Appl. No.: 18/168,501

(22) Filed: Feb. 13, 2023

(65) Prior Publication Data

US 2023/0255353 A1 Aug. 17, 2023

Related U.S. Application Data

(60) Provisional application No. 63/268,054, filed on Feb. 15, 2022.

(51) Int. Cl.
*B29C 45/14* (2006.01)
*A47B 91/06* (2006.01)
*B29C 45/04* (2006.01)
*B29L 31/44* (2006.01)

(52) U.S. Cl.
CPC .......... *A47B 91/066* (2013.01); *B29C 45/04* (2013.01); *B29C 45/14467* (2013.01); *B29L 2031/44* (2013.01)

(58) Field of Classification Search
CPC .......... B29C 45/14754; B29C 45/0017; B29C 2045/1601
See application file for complete search history.

(56) References Cited

U.S. PATENT DOCUMENTS

| | | | | |
|---|---|---|---|---|
| 4,049,231 A * | 9/1977 | Lutz | ..................... | A45C 13/005 425/588 |
| 4,380,178 A * | 4/1983 | Bennett | .................. | F16C 1/265 403/197 |
| 4,680,837 A * | 7/1987 | Rubinstein | .............. | F16G 15/08 24/601.2 |
| 5,647,713 A * | 7/1997 | Ge | .......................... | F16B 5/065 24/324 |
| 5,702,660 A * | 12/1997 | Allott | ................ | B29C 45/14754 264/242 |
| 6,343,888 B1 * | 2/2002 | Huhn | ..................... | F01B 3/0085 403/280 |
| 7,306,755 B2 * | 12/2007 | Morello | ................ | F16L 3/2334 264/328.8 |
| 11,672,339 B2 | 6/2023 | Crowe et al. | | |

* cited by examiner

*Primary Examiner* — Edmund H Lee
(74) *Attorney, Agent, or Firm* — Knobbe, Martens, Olson & Bear, LLP

(57) ABSTRACT

A swivel glide is disclosed herein. The swivel glide can include an upper member coupled to a leg of a furniture and a lower member coupled to the upper member via a ball and socket joint. Both the upper member and the lower member are manufactured via injection molding methods. In one example, a cavity side mold and a core side mold can be coupled together prior to injection molding the upper member. Once finished, the molds can be separated and the upper member can be removed from the molds. In another example, the lower member is injection molded and the upper member is injection molded on top of the lower member.

7 Claims, 15 Drawing Sheets

METHOD OF MANUFACTURING AT LEAST A PORTION OF A SWIVEL GLIDE

BACKGROUND

Field

This disclosure is generally related to furniture swivel glides.

Description of the Related Art

Glides are attached to the bottom of furniture legs and allow furniture to glide over surfaces. Some glides can include a joint that allows them to tilt at an angle. Such feature can allow the glides to maintain good contact with surfaces when furniture is tilted at an angle.

SUMMARY

In some aspects, the techniques described herein relate to a method of manufacturing an upper member a swivel glide, the method including: providing a first mold, the first mold including a first bottom surface, a first top surface, a first cavity, and a spherical protrusion, the spherical protrusion positioned in the first cavity formed on the first top surface, the spherical protrusion including a plurality of cutouts formed on an outer surface of the spherical protrusion and extending along at least a portion of a height of the spherical protrusion; providing a second mold, the second mold including, a second bottom surface, a second top surface, a second cavity, and a plurality of arms; positioning the second mold on top of the first mold such that the first top surface of the first mold is abutted against the second bottom surface of the second mold, the plurality of cutouts of the first mold configured to receive the plurality of arms of the second mold when the second mold is positioned on top of the first mold; injecting a first moldable material in the first mold and the second mold while the second mold is positioned on top of the first mold; curing the first moldable material; separating the first mold and the second mold to remove the upper member of the swivel glide.

In some aspects, the techniques described herein relate to a method, wherein the spherical protrusion has a shape corresponding to a socket of an upper member of the swivel glide. In some aspects, the techniques described herein relate to a method, wherein the spherical protrusion extends in a first direction away from the first bottom surface. In some aspects, the techniques described herein relate to a method, wherein the plurality of arms positioned in the second cavity and extending in a second direction away from the second top surface. In some aspects, the techniques described herein relate to a method further including: providing a third mold having a third cavity for receiving the upper member and a fourth cavity for forming a lower member of the swivel glide; positioning the upper member within the third mold; injecting a second moldable material into the fourth cavity; curing the second moldable material; removing the swivel guide from the third mold, wherein the upper member is coupled to the lower member, wherein upper member is configured to swivel with respect to the lower member. In some aspects, the techniques described herein relate to a method, wherein the first moldable material and the second moldable material are the same. In some aspects, the techniques described herein relate to a method, wherein the first moldable material and the second moldable material are different.

In some aspects, the techniques described herein relate to a method of manufacturing a swivel glide, the method including: providing a mold having a first cavity for forming a lower member of a swivel glide and a second cavity for forming an upper member of the swivel glide; injecting a first moldable material in the first cavity of the mold; curing the first moldable material; injecting a second moldable material in the second cavity of the mold with the lower member in the first cavity of the first mold; curing the second moldable material; and removing the swivel guide from the first mold, wherein the upper member is coupled to the lower member, wherein upper member is configured to swivel with respect to the lower member.

In some aspects, the techniques described herein relate to a method, wherein the first moldable material and the second moldable material are the same. In some aspects, the techniques described herein relate to a method, wherein the mold includes a first mold portion, a second mold portion and a third mold portion, the first mold including a first bottom surface, a first top surface, a first cavity, and a spherical protrusion, the spherical protrusion positioned in the first cavity formed on the first top surface, the spherical protrusion including a plurality of cutouts formed on an outer surface of the spherical protrusion and extending along at least a portion of a height of the spherical protrusion, and the second mold portion including, a plurality of arms, a second cavity for a portion of the upper member, and a third cavity for a portion of the lower member, wherein the third mold portion includes a fourth cavity for a portion of the lower member.

In some aspects, the techniques described herein relate to a swivel glide including: an upper member configured to couple to a tubular support member of a furniture including a first portion of a ball and socket joint; a lower member including a second portion of the ball and socket joint, the ball and socket joint configured for the upper member to swivel with respect to the lower member; a base member removably coupled to the lower member, the base member including a bottom surface including a material different from a material of the lower member.

In some aspects, the techniques described herein relate to a swivel glide, wherein the first portion of the ball and socket joint is the socket and the second portion of the ball and socket joint is the ball. In some aspects, the techniques described herein relate to a swivel glide, wherein the second portion of the ball and socket joint is the socket and the first portion of the ball and socket joint is the ball. In some aspects, the techniques described herein relate to a swivel glide, wherein the first portion of the ball and socket joint is releasably coupled to the second portion of the ball and socket joint.

In some aspects, the techniques described herein relate to a swivel glide, wherein the ball and socket joint has a minimum retention force of 50 lbs, wherein the retention force is an amount of force needed to separate the first portion of the ball and socket joint from the second portion of the ball and socket joint. In some aspects, the techniques described herein relate to a swivel glide, wherein the first portion of the ball and socket joint is permanently coupled to the second portion of the ball and socket joint.

In some aspects, the techniques described herein relate to a swivel glide, wherein the at least one of the upper member or the lower member is formed from a thermoset material or thermoplastic material. In some aspects, the techniques described herein relate to a swivel glide, wherein the at least one of the upper member or the lower member is formed using injection molding. In some aspects, the techniques described herein relate to a swivel glide, wherein the at least one of the upper member or the lower member is formed from a metal. In some aspects, the techniques described herein relate to a swivel glide, wherein the material of the bottom surface is at least one of felt, nylon, steel, or rubber.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure. Throughout the drawings, reference numbers can be reused to indicate general correspondence between referenced elements. The drawings are provided to illustrate example embodiments of the subject matter described herein and not to limit the scope of the disclosure.

DETAILED DESCRIPTION

Manufacturing traditional metal swivel glides can be complicated and require metal forming and related tooling such as punch presses and progressive stamping dies. Moreover, it can require the assembly of different materials, significant labor and factory space for equipment needed, and purchasing/inventory of various materials for manufacturing. As such, manufacturing cost for traditional metal swivel slides can be high.

Instead of the traditional metal swivel glides, the present disclosure describes the manufacture and use of injection molded swivel glides. Injection molded parts can be manufactured with one or more injection molds with minimal labor. Compared to machines needed for manufacturing traditional metal swivel glides, injection molding machines occupy relatively less space. When using injection molding, no metal fabrication, stamping dies, or tool and die expertise is needed. Various types of materials (for example, plastic or a polymer) can be used to manufacture injection molded swivel glides.

Some benefits associated with using injection molded swivel glides include weather resistance (traditional steel swivel glides can rust in outdoor applications, while injection molded components do not), increased customizability for the swivel glide (for example, variation in surface treatment), and manufacturing cost reductions from using, for example, plastic instead of metal.

In some embodiments, a base member of the swivel glide can swivel within a range that allows the base member of the swivel glide to remain flat in contact with the floor, while allowing the leg of a furniture to be at an angle relative to the floor. For example, when a user is leaning back in a chair, the base member may remain in contact with the floor. The upper member (or collar) may be securely coupled (removably or permanently) to a bottom portion of a leg of a chair and not fall off when the chair is lifted.

Various components of the swivel glide described herein may be dimensioned and shaped to provide sufficient durability. For example, a neck of a pivoting ball may have a certain dimension such that the base member does not break at the neck and separate from the upper member during use. The swivel glide may be manufactured using various types of materials, including molded materials such as thermoset and thermoplastic materials, that are able to better tolerates various outdoor exposures without adverse effects (for example, rust from moisture). Examples of thermoplastic materials include nylon, polypropylene, ABS, ASA, or PET. Examples of thermoset materials include polyurethanes, polyester and PVC. In some embodiments, the base member and the upper member may be formed from different materials. For example, the base member may be manufactured from stainless steel and the upper member formed from a thermoset or thermoplastic material. Optionally, the swivel glide may have indexing (e.g., multi-directional swivel).

Figure 1A:
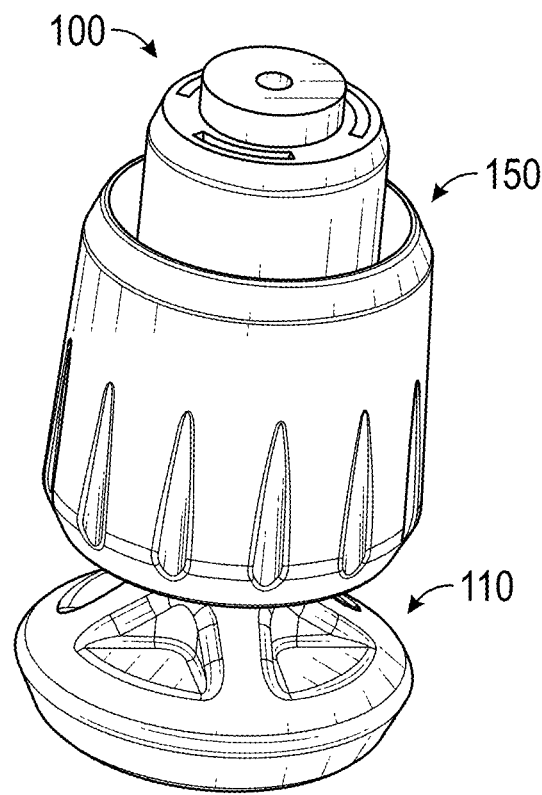
FIGS. 1A and 1B illustrate various perspective views of an example embodiment of a furniture swivel glide.
Figure 1B:
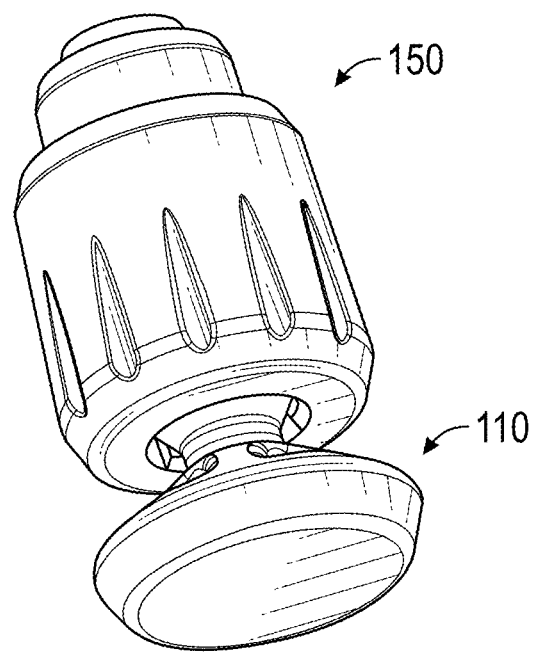

FIGS. 1A and 1B illustrates an example embodiment of a swivel glide 100. The swivel glide 100 can include a lower member (or a base member) 110 and an upper member 150. The lower member 110 and the upper member 150 can be coupled to each other (removably or permanently) such that the lower member 110 can swivel in within a defined range of motion with respect to the upper member 150. The upper member 150 can be coupled (removably or permanently) to a leg of a furniture, such as a chair. The removable coupling between the upper member 150 and the lower member 110 can allow the lower member 110 to be removed and replaced when needed (for example, due to standard wear and tear or when the product is used in a different environment, such as from carpet to concrete).

In some embodiments, both the lower member 110 and the upper member 150 can be made out of the same material.

For example, both the lower member 110 and the upper member 150 can be made out of plastic, polymer, or other materials that can be used for injection molding. In some embodiments, both the lower member 110 and the upper member 150 may be injection molded. Use of plastic, polymer, or other materials that do not rust can allow the swivel glide 100 to be used in outdoor settings.

Figure 2A:
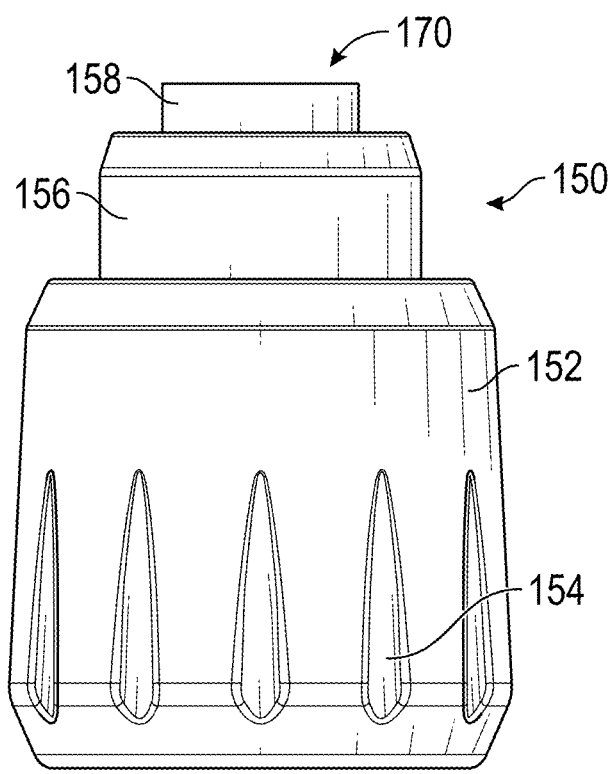
FIGS. 2A, 2B, and 2C illustrate various views of a glide cup of the furniture swivel glide of FIGS. 1A and 1B.
Figure 2B:
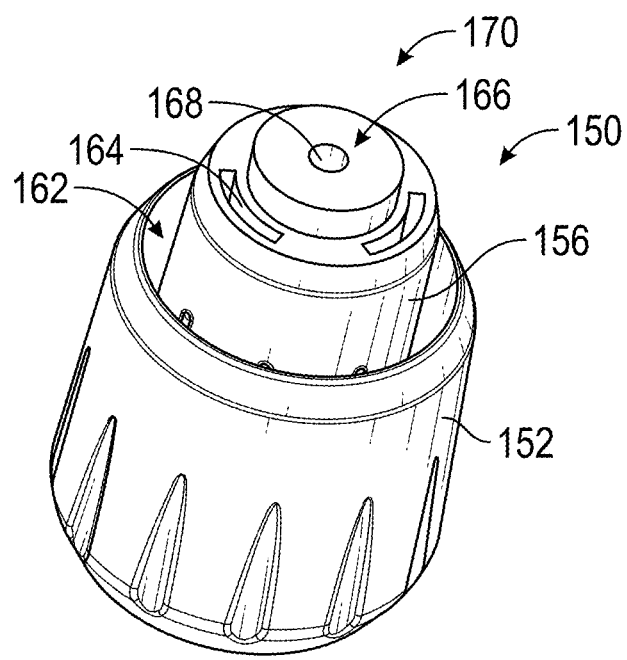
Figure 2C:
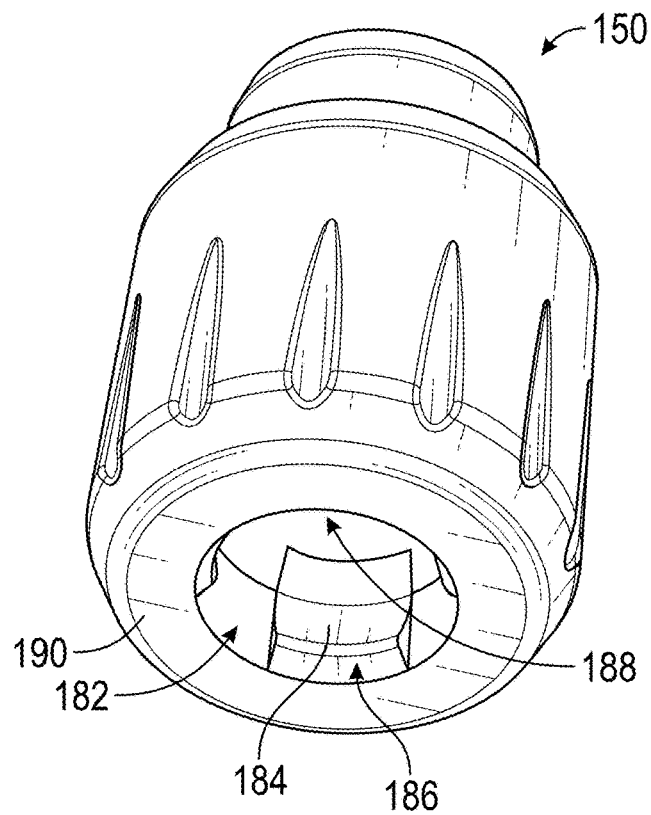

With respect to FIGS. 2A, 2B, and 2C, the upper member 150 can include an outer cover 152, an inner body 156, a protrusion 158, a distal end 160, and a proximal end 170. The outer cover 152 can extend upwards from the distal end 160 of the upper member 150 towards the proximal end 170. The outer cover 152 can circumferentially surround the inner body 156.

The outer cover 152 can include one or more grooves 154 that can facilitate gripping of the outer cover 152. In the illustrated embodiment, the grooves 154 are elongated circular cutouts. However, other cross-sectional shapes and sizes can be utilized.

In the illustrated embodiment (for example, as shown in FIG. 2B), a channel 162 can be formed between the inner body 156 and the outer cover 152. The channel 162 can be dimensioned to receive ends of furniture legs of different thicknesses and different tolerances. The channel 162 can extend circumferentially around the outer surface of the inner body 156. The channel can be tapered such that a width of the channel is greater at the opening of the channel than at the end of the channel.

The protrusion 158 can be formed on a proximal end of the inner body 156. In the illustrated embodiment (for example, as shown in FIG. 2B), the protrusion 158 can extend proximally (for example, in a direction away from the distal end 160 as shown in FIG. 2A). The inner body 156 can include slots 164 that can receive coupling devices (for example, pins or flanges) that can facilitate coupling of the upper member 150 to a furniture leg (for example, tubular). Optionally, the protrusion 158 can include an aperture 166 for a bore 168 formed on a proximal end surface of the protrusion 158. The bore 168 can be used to receive a coupling device (for example, a screw or rivet) that can facilitate coupling between a furniture leg and the upper member 150.

In some embodiments, the bore 168A168 can extend through at least a portion of the protrusion 158. Alternatively, the bore 168A168 can extend through the protrusion 158 and into a portion of the inner body 156.

In some embodiments, the bore 168A168 can define a central axis of the upper member 250. Alternatively, the bore 168A168 can be offset from a central axis of the upper member 250.

The upper member 150 can include a cavity 182 and an opening 188 formed at the distal end 160. The cavity 182 can include one or more ridges 184 formed on a surface of the cavity 182. The ridge 184 can extend in a proximal-distal direction (for example, as shown in FIG. 2C) and can include an edge 186 that can be raised with respect to other portions of the ridge 184. The edge 186 can be positioned proximate to the distal end 160.

Figure 3A:
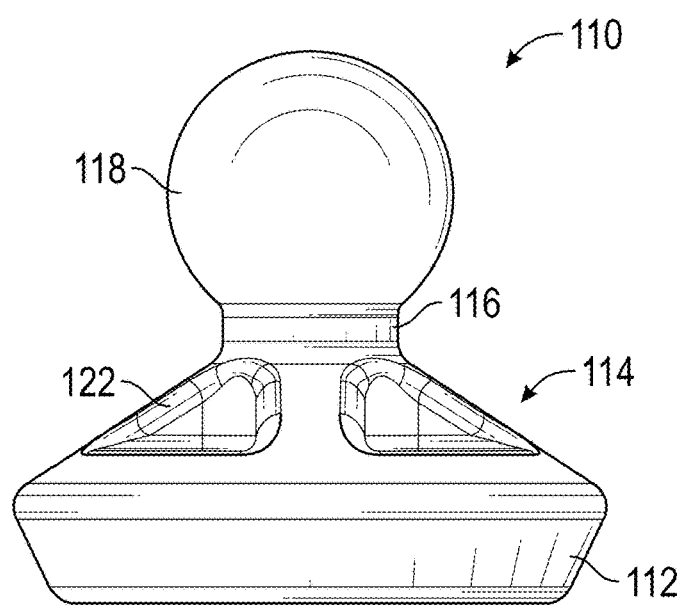
FIGS. 3A, 3B, and 3C illustrate various views of a glide base of the furniture swivel glide of FIGS. 1A and 1B.
Figure 3B:
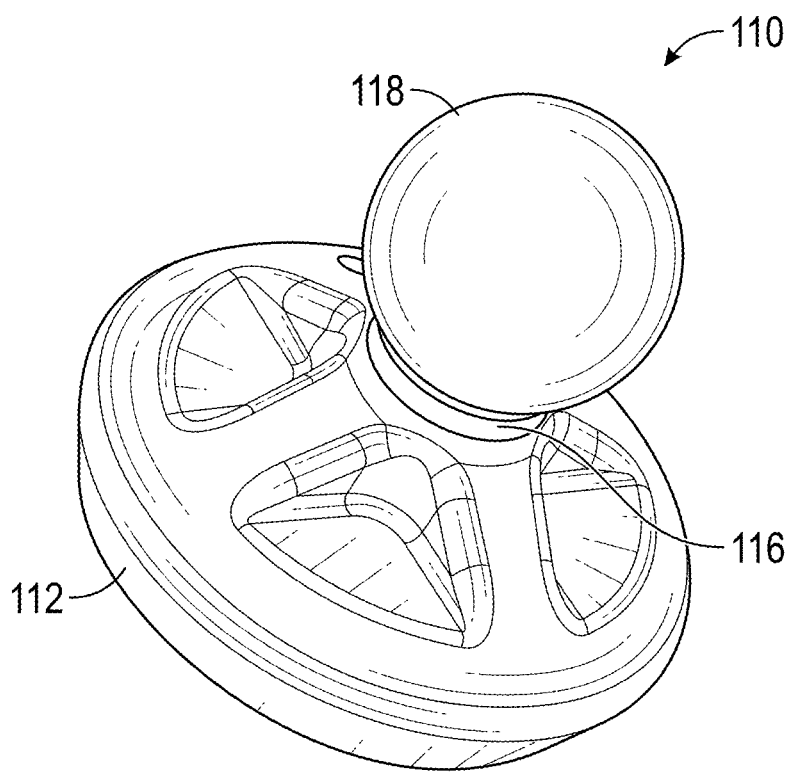
Figure 3C:
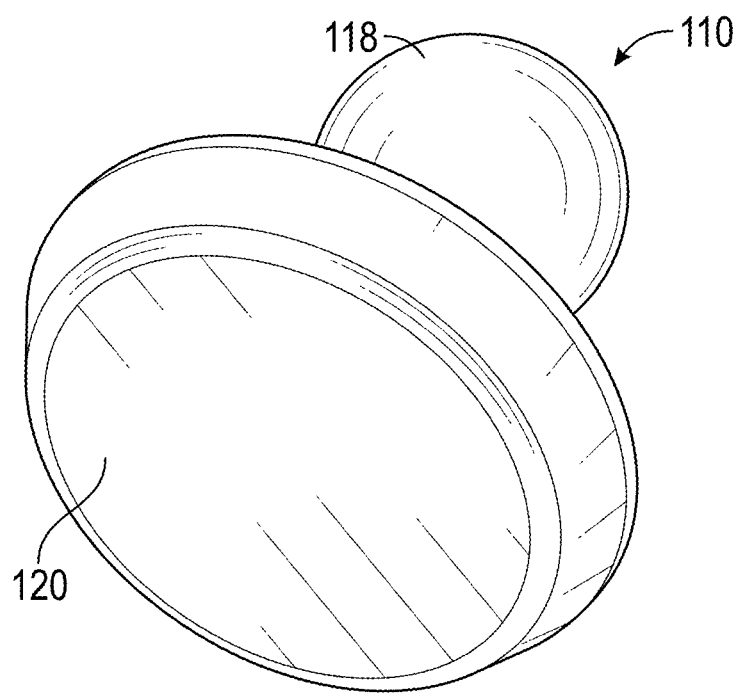

With reference to FIGS. 3A, 3B, and 3C, the lower member 110 can include a base 112, a ball 118, an intermediate portion 114, and a neck 116. The base 112 can include a surface 120 that can contact the floor during use. The ball 118 can be shaped and dimensioned to be inserted into the cavity 182 via the opening 188 (see FIG. 2C for example).

In some embodiments, different materials can be affixed to the surface 120. Some example materials include, but not limited to, nylon, steel, felt, rubber, and so forth.

Figure 4:
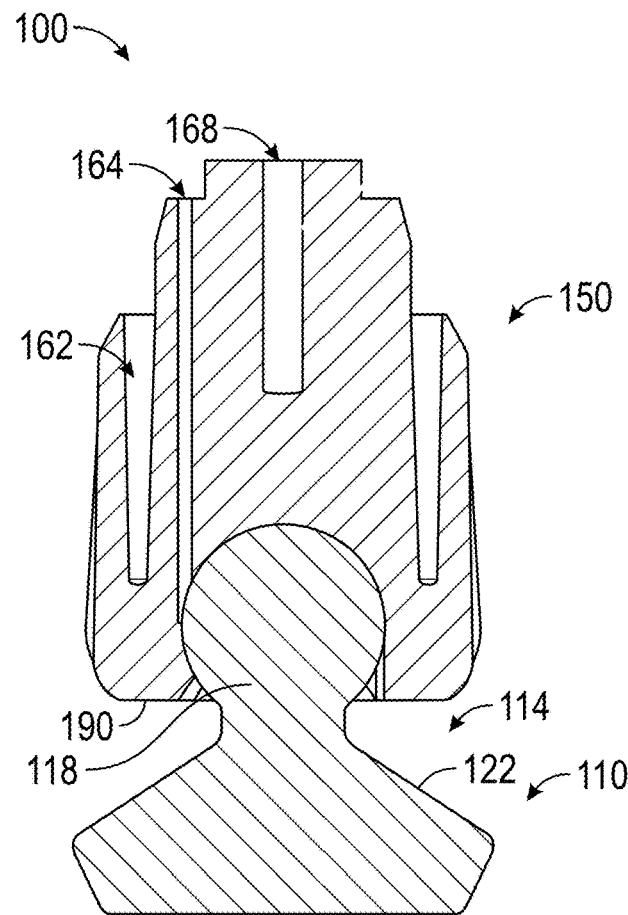
FIG. 4 illustrates a cross-sectional view of the furniture swivel glide of FIGS. 1A and 1B.

FIG. 4 illustrates a cross-sectional view of the swivel glide 100. As shown in FIG. 4, the ball 118 of the lower member 110 can be inserted into the cavity 182. In the illustrated embodiment, the slots 164 can extend from the proximal end 170 towards the cavity 182. In some examples, the slots 164 can extend between the proximal end 170 and the cavity 182.

The dimensions of the upper member 150 and that of the lower member 110 can determine the range of motion (for example, swivel) of the lower member 110 (or the upper member 150) with respect to another. In the illustrated embodiment in FIG. 4, the upper member 150 can be tilted such that a bottom surface 190 of the upper member 150 is approximated towards an outer contour 122 of the intermediate portion 114 of the lower member 110. Accordingly, the relative positions of the bottom surface 190 of the upper member 150 and the outer contour 122 of the lower member 110 determines the range of motion (for example, swivel) of the swivel glide 100.

A ball and socket joint formed by the ball 118 and the cavity 182 allows for great range of motion for the lower member 110 with respect to the upper member 150. However, traditional sockets are difficult to manufacture using standard injection molding methods. If standard molding methods were used, it would be difficult to remove the resulting part (for example, the upper member 150 with the cavity 182) from the mold without causing significant damage or deformation to the resulting part.

Figure 5A:
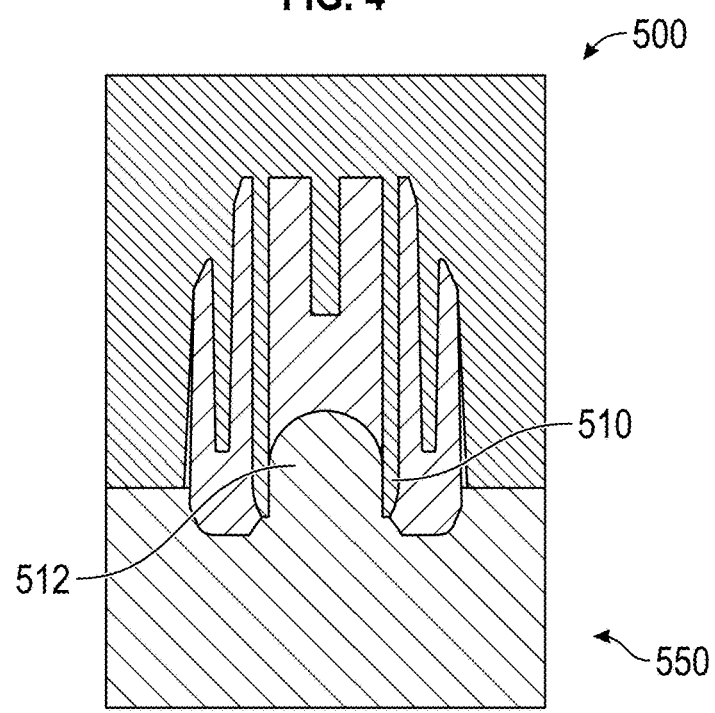
FIG. 5A illustrates a schematic view of an example molding device for manufacturing the furniture swivel glide of FIGS. 1A and 1B.
Figure 5B:
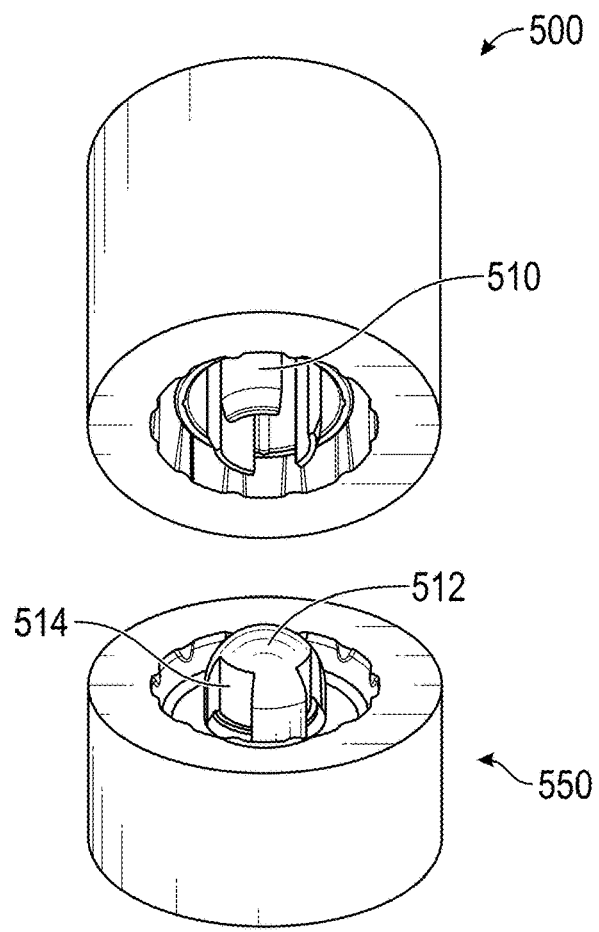
FIG. 5B illustrates a perspective view of an embodiment of a molding device for manufacturing the furniture swivel glide of FIGS. 1A and 1B.

With reference to FIGS. 5A and 5B, a cavity side mold 500 and a core side mold 550 can be used together for manufacturing (for example, injection molding) the upper member 150. The cavity side mold 500 can be positioned on top of the core side mold 550 as shown in FIG. 5A. The cavity side mold 500 can include arms 510 and the core side mold 550 can include a core 512 and cutouts 514 that correspond to the arms 510. The cutouts 514 can slidingly receive the arms 510 when the cavity side mold 500 is positioned on top of the core side mold 550 (for example, as shown in FIG. 5A). Once the cavity side mold 500 and the core side mold 550 are positioned as shown in FIG. 5A, injection molding can begin to manufacture the upper member 150. Once injection molding is complete, the cavity side mold 500 can be separated (for example, slidingly moved away) from the core side mold 550, and the upper member 150 can be safely removed from, for example, the cavity side mold 500. This process can prevent damage to the upper member 150.

Figure 5C:
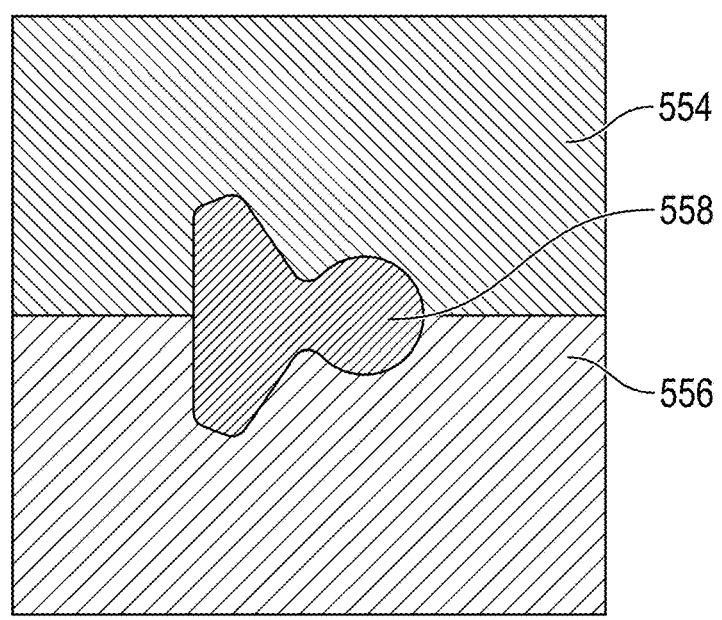
FIG. 5C illustrates an embodiment of a two-part molding device for manufacturing the furniture swivel glide of FIGS. 1A and 1B.

With reference to FIG. 5C, a mold 552 have a first side 554 and a second side 556 can be used together for manufacturing (for example, injection molding) the lower member 110. The first side mold 554 can be positioned on top of the second side mold 556 as shown in FIG. 5C. The molds form a cavity 558 having spherical protrusion connect to a flat base. The lower member 110 can be coupled with the upper member 150. As described herein, the ball 118 of the lower member 110 can be inserted into the cavity 182 of the upper member 150 by pushing the ball 118 into the cavity 182 via the opening 188.

Figure 6:
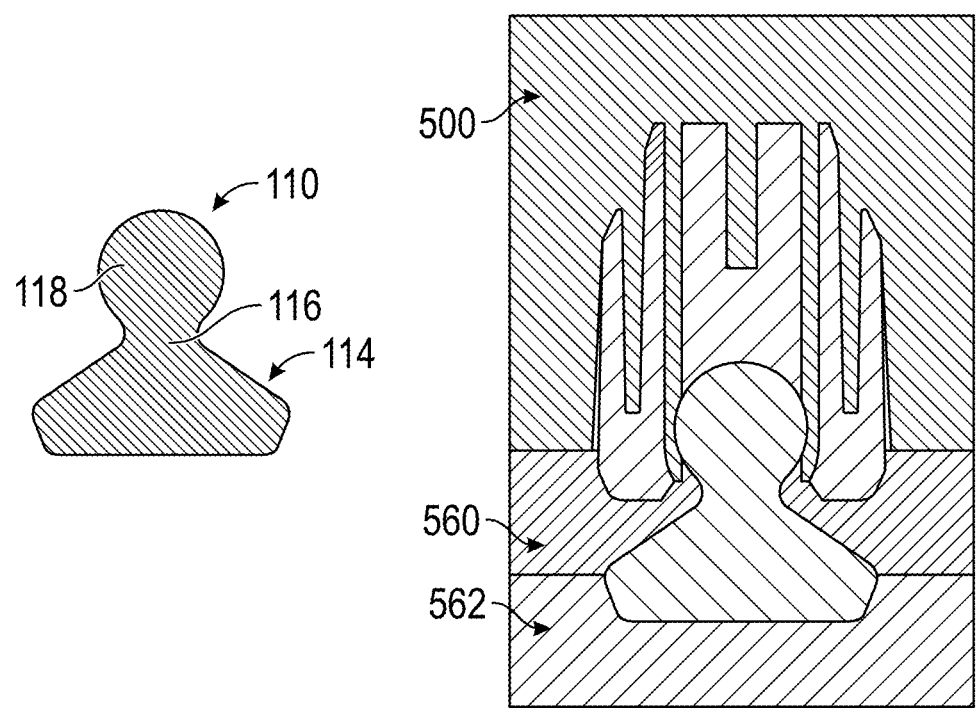
FIG. 6 illustrates a schematic view illustrating an embodiment of a process of manufacturing the furniture swivel glide of FIGS. 1A and 1B.

With reference to FIG. 6, in some embodiments, the swivel glide 100 can be manufactured by injection molding the upper member 150 over the lower member 110. The lower member 110 can be manufactured (for example, injection molded) first via, for example, standard injection molding methods using molds 560, 562. Molds 560, 562 can replace mold 550 as discussed with respect to FIGS. 5A and 5B. The mold 562 can be a mold for, for example, injection molding a bottom portion of the lower member 110, while the mold 560 can be a mold for, for example, injection molding an upper portion of the lower member 110. The mold 560 can include at least a portion of the intermediate portion 114. Additionally or alternatively, the mold 560 can include at least a portion of the neck 116. Additionally or alternatively, the mold 560 can include at least a portion of the ball 118. Subsequently, the upper member 150 can be injection molded, for example, over the ball 118 of the lower member 110 using mold 500, such as further described with respect to FIGS. 5A and 5B. Mold This method can eliminate the need to manufacture (for example, injection mold) the upper member 150 and the lower member 110 separately.

Figure 7B:
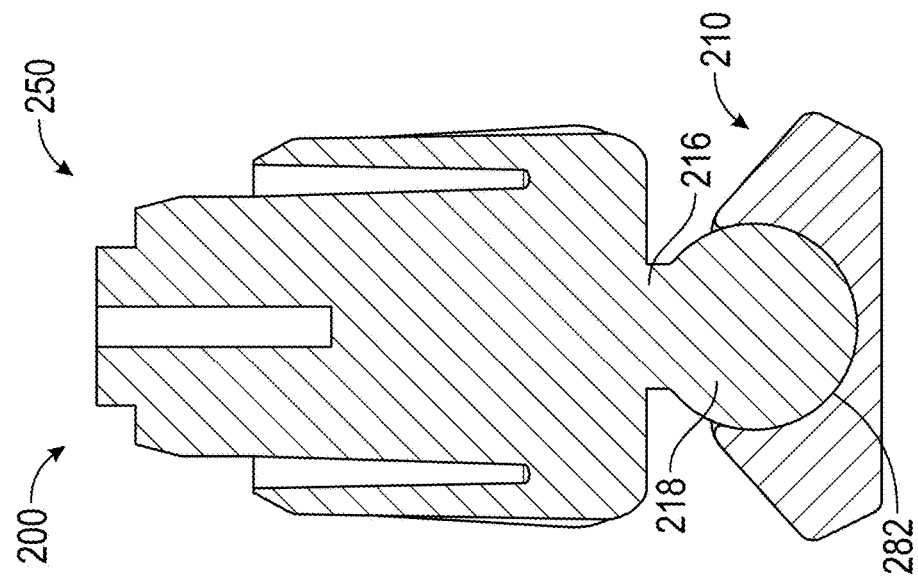
FIG. 7B illustrates a cross-sectional view of the furniture swivel glide of FIG. 7A along lines A-A shown in FIG. 7A.
Figure 7A:
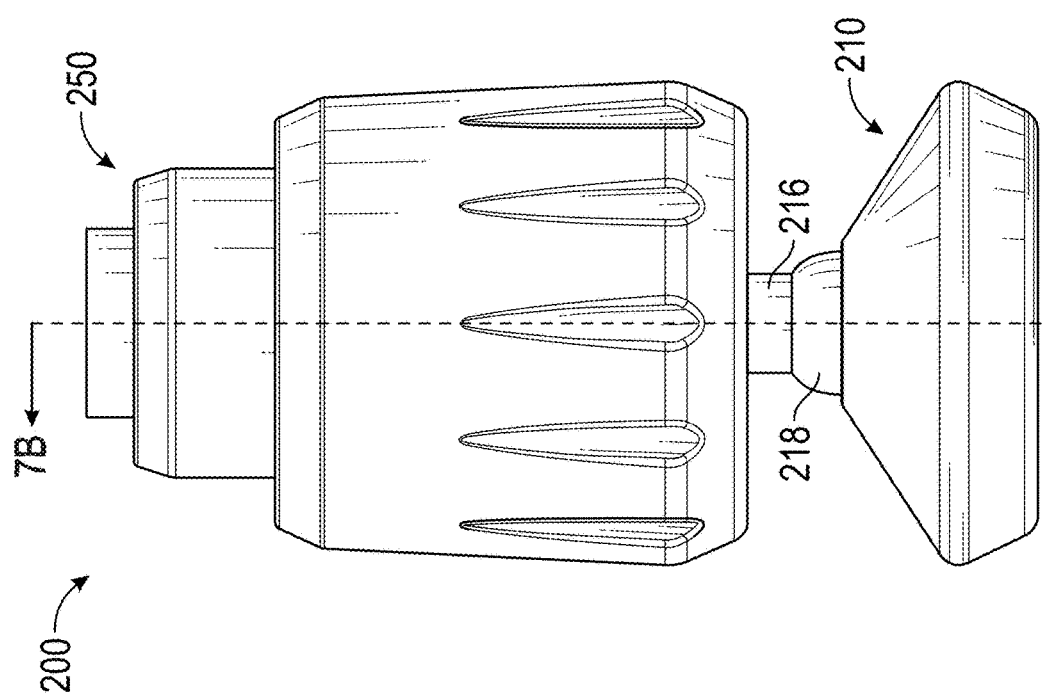
FIG. 7A illustrates a side view of another example embodiment of a furniture swivel glide.
Figure 7C:
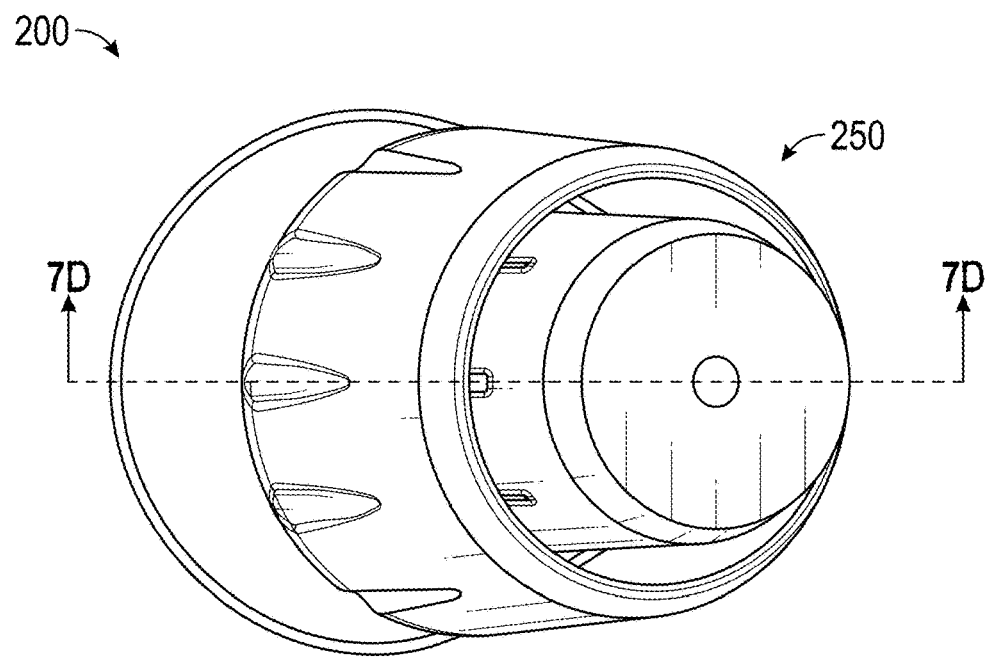
FIG. 7C illustrates a top view of the furniture swivel slide tilted at an angle.
Figure 7D:
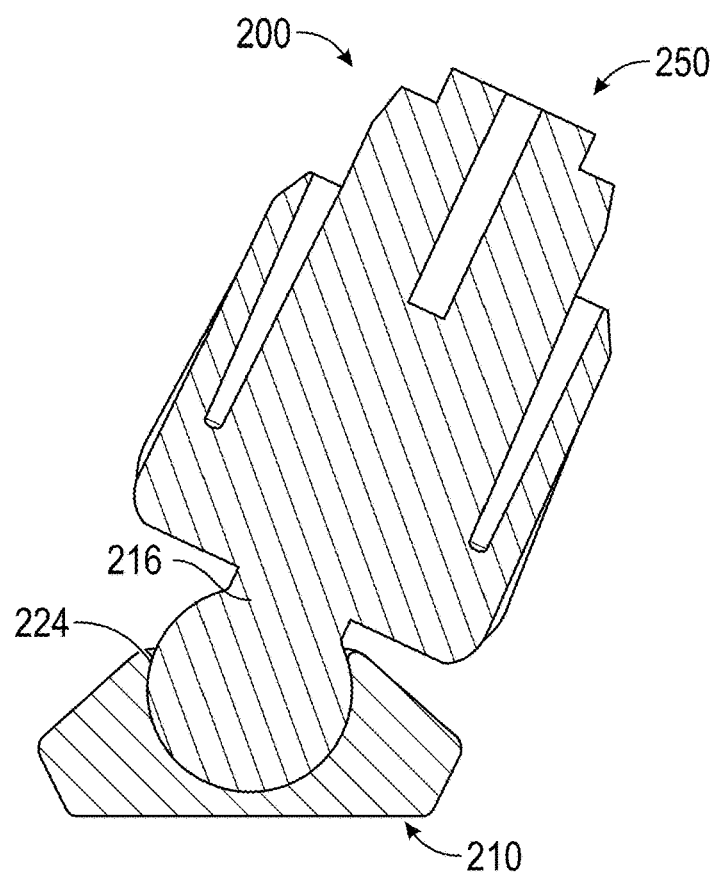
FIG. 7D illustrates a cross-sectional view of the furniture swivel glide of FIG. 7C along lines B-B shown in FIG. 7C.

With reference to FIGS. 7A-7D, another example embodiment of a swivel glide is disclosed. A swivel glide 200 can include an upper member 250 and a lower member 210. In the illustrated embodiment in FIGS. 7A-7D, in contrast to the example embodiment shown in, for example, FIG. 4, the upper member 250 includes a neck 216 and a ball 218, while the lower member 210 includes a cavity 282 dimensioned to receive the ball 218 and provide a ball and socket joint for the swivel glide 200. As shown in FIG. 7B, the body of the lower member 210 can define the cavity 282. The lower member 210 can include an upper edge 224 that can come in contact with the neck 216 to stop the movement (for example, swiveling) of the upper member 250 (or the lower member 210) with respect to another. In the example illustrated in FIG. 7D, the upper member 250 can tilt approximately 65 degrees to 130 degrees with respect to the lower member 210. It is contemplated that other swivel ranges (that is, the range of angle at which the upper member 250 can be tilted with respect to the lower member 210, or vice versa) greater than 65 degrees, less than 65 degrees, less than 130 degrees, between 65 and 130 degrees, or other subsets of ranges that can be utilized for various embodiments of a swivel glide disclosed herein.

Figure 8A:
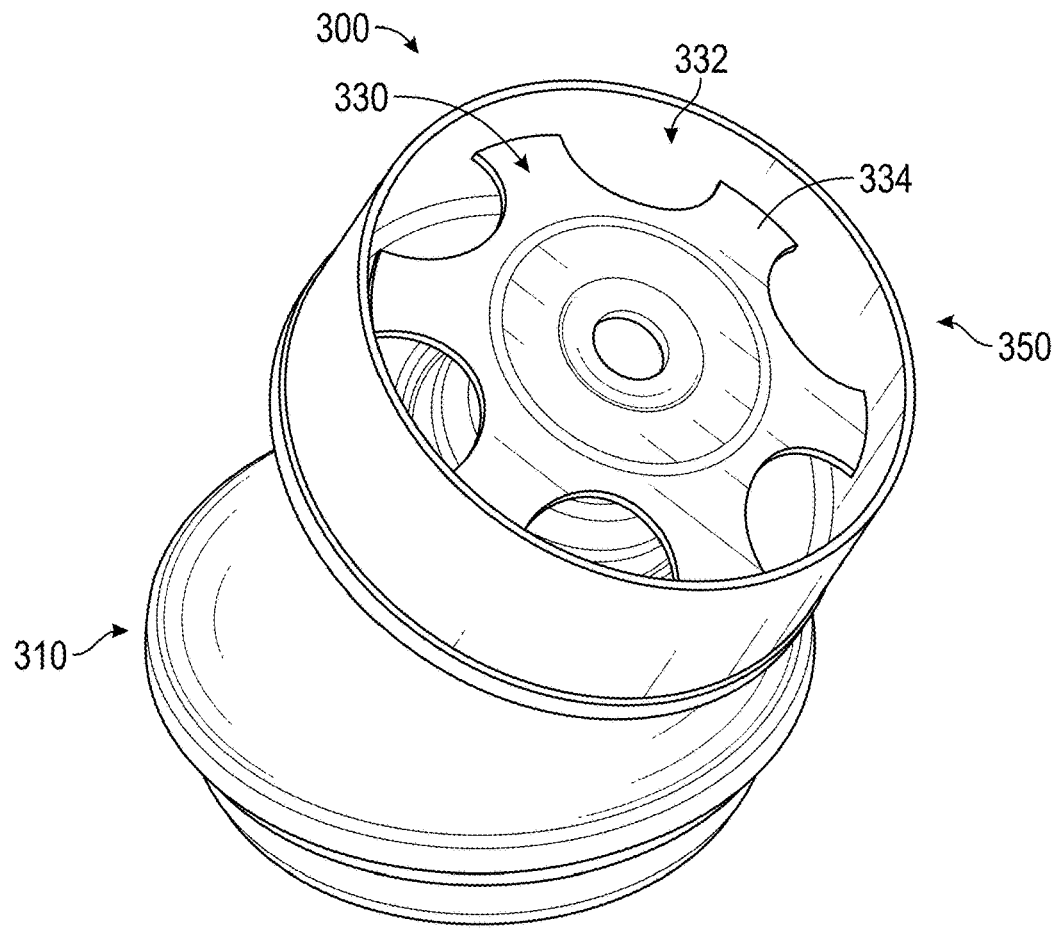
FIG. 8A illustrates a perspective view of another example embodiment of a furniture swivel glide.
Figure 8B:
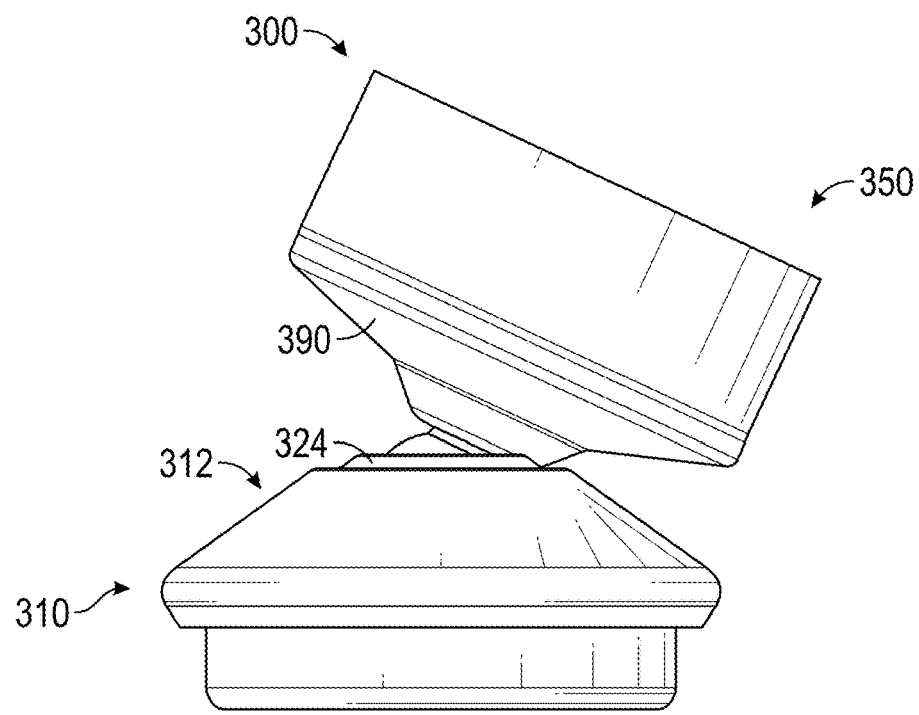
FIG. 8B illustrates a side view of the furniture swivel glide of FIG. 8A.
Figure 8C:
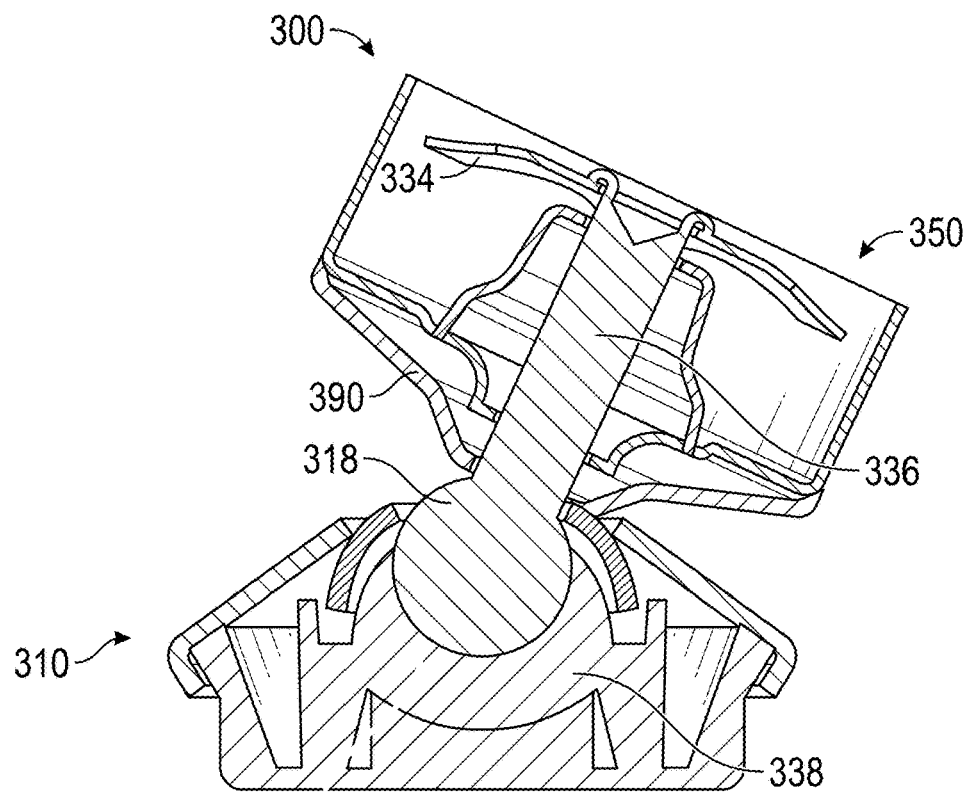
FIG. 8C illustrates a cross-sectional view of the furniture swivel glide of FIG. 8B along lines 8C-8C shown in FIG. 8B.

FIGS. 8A-8C illustrates another example embodiment of a swivel glide. A swivel glide 300 can include an upper member 350 and a lower member 310. The upper member 350 and the lower member 310 can be coupled (for example, removably) to each other via a ball and socket joint. The upper member 350 can include a shaft 336, a ball 318, a bottom surface 390 (or contact surface), a coupling device 330. The coupling device 330 can include 332 arms 334 with gaps 332 between the arms. The coupling device 330 can be used permanently attach the upper member 350 to a leg (for example, an elongated hollow tubular support structure) of a furniture.

The coupling device 330 can be coupled to the shaft 336 and can be used to couple (for example, permanently) the upper member 350 to a leg of a furniture. The shaft 336 can be integrated with the ball 318.

The lower member 310 can include a socket body 338 and the upper edge 324 that can (together or individually) hold the ball 318 such that the ball 318 (and therefore the upper member 350) is coupled to the lower member 310.

In some embodiments, the relative positions of the outer contour 312 (or the upper edge 324) of the lower member 310 and the bottom surface 390 (or contact surface) of the upper member 350 can determine the range of motion between the upper member 350 and the lower member 310. For example, the upper member 350 can tilt towards the lower member 310 until the contact surface 390 contacts the outer contour 312 (or the upper edge 324).

Figure 9:
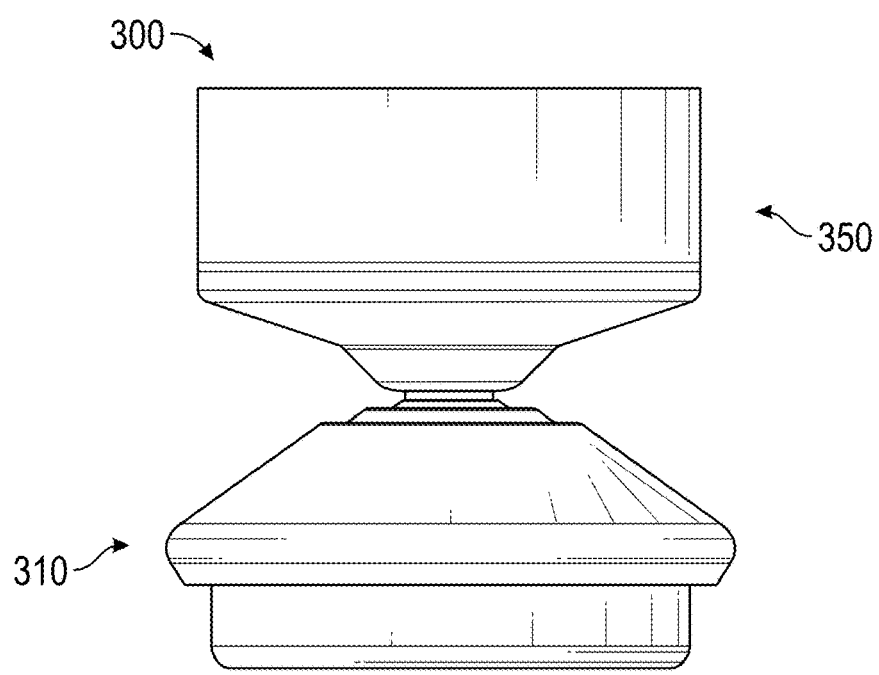
FIGS. 9, 10, 11, 12A, and 12B illustrate various example embodiments of a swivel glide.
Figure 10:
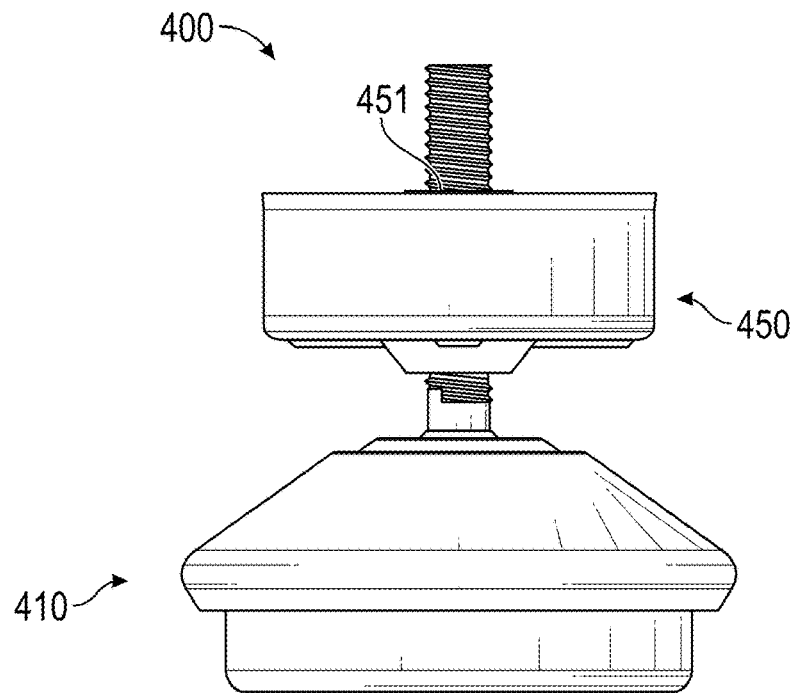

FIGS. 9 and 10 illustrate various example embodiments of a swivel glide. A swivel glide 300 can include an upper member 350 (for example, the upper member 150) and a lower member 310 (for example, the lower member 110) that can be coupled to each other using a ball and socket joint (for example, as illustrated in FIGS. 8A-8C). In the example illustrated in FIG. 9, the distance between the upper member 350 and the lower member 310 may not be adjustable. In contrast, in the example of the swivel glide 400 illustrated in FIG. 10, the ball of the ball and socket joint can be a part of a threaded screw 451 that is coupled to an upper member 450. As such, by rotating the upper member 450 with respect to the threaded screw 451, the distance between the upper member 450 and a lower member 410 can be adjusted.

Figure 11:
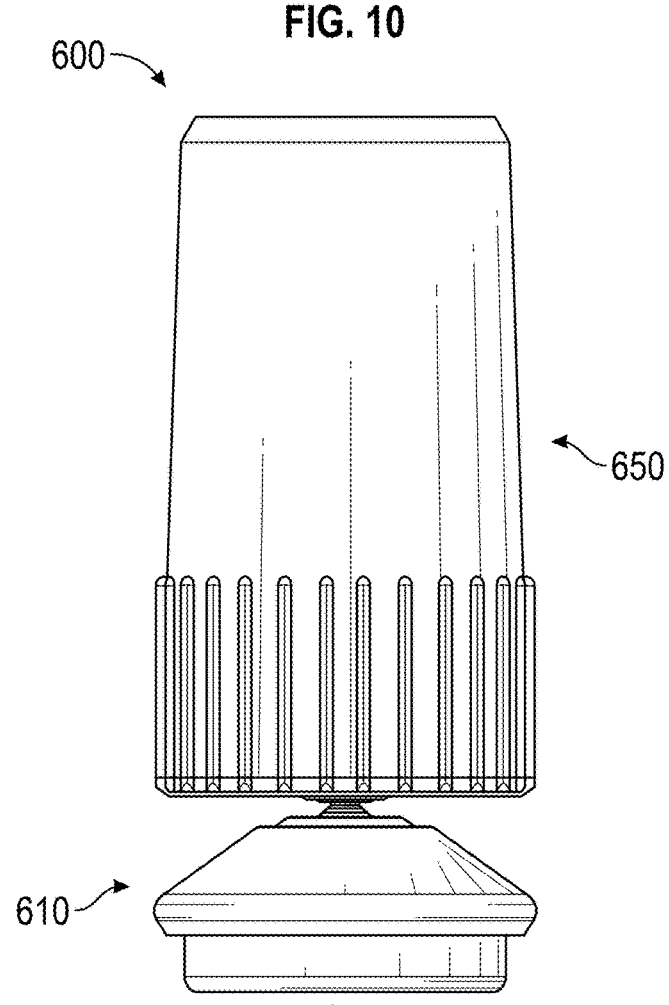

FIG. 11 illustrates another example embodiment of a swivel glide 600 described herein having an upper member 650 (for example, the upper member 150) and a lower member 610 (for example, the lower member 110) that can be coupled to each other using a ball and socket joint (for example, as illustrated in FIG. 4).

Figure 12B:
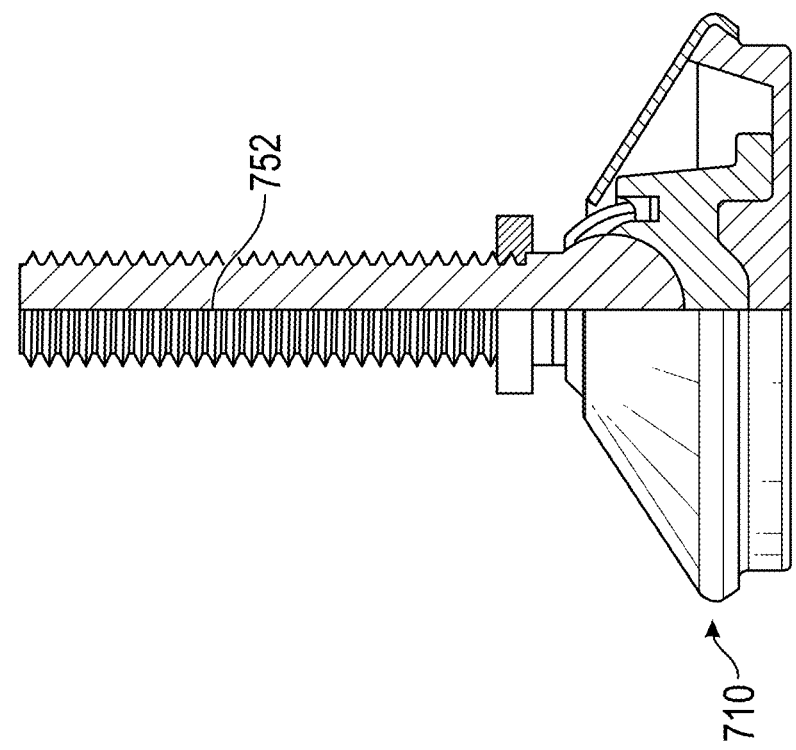
Figure 12A:
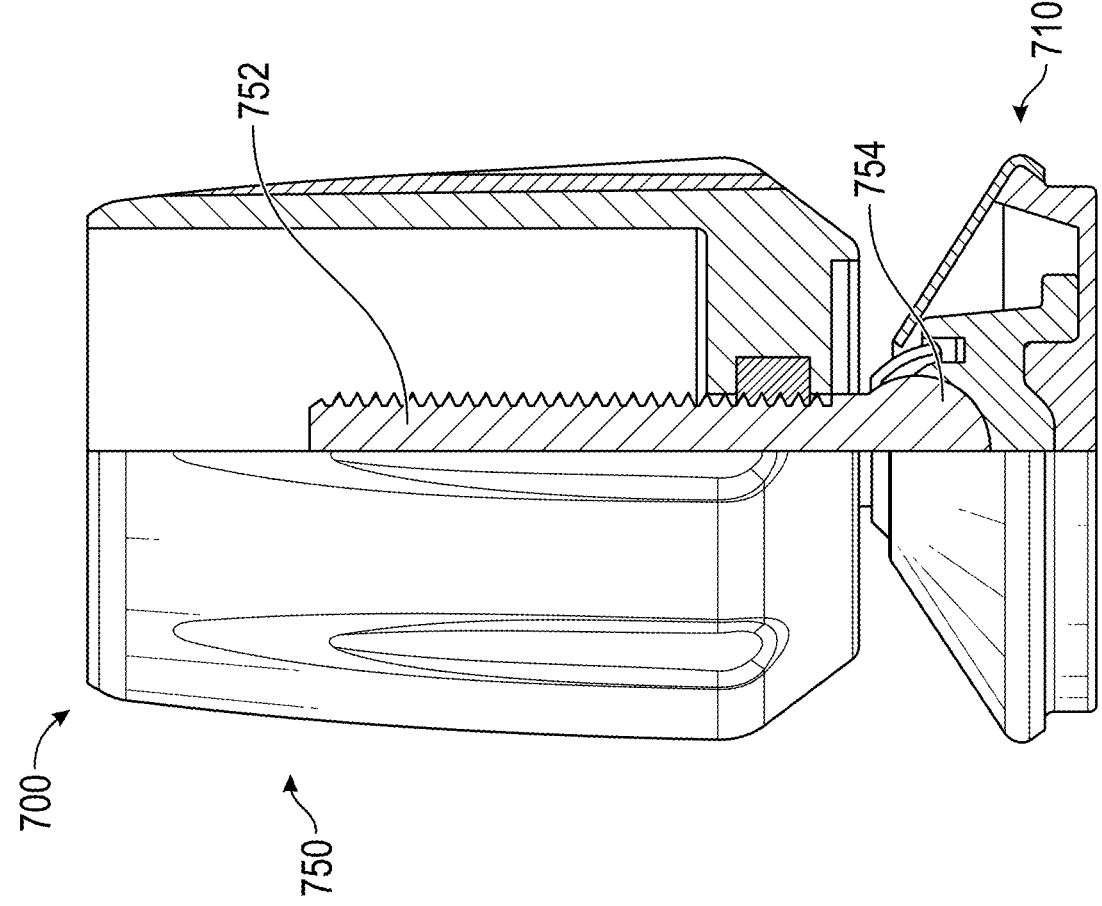

FIGS. 12A and 12B illustrate various views of another example embodiment of a swivel glide. FIG. 12A illustrates a swivel glide 700 with an upper member 750 (for example, the upper member 250) and a lower member 710 (for example, the lower member 210) in an assembled state. The upper member 750 can include a screw 752. The screw 752 can be fixedly coupled to the upper member 750 and include a ball 754. FIG. 12B illustrates the swivel glide 700 without the upper member 750. The screw 752 can be coupled to the lower member 710 via a ball and socket joint (that includes the ball 754) and can be coupled to the upper member 750 to allow the upper member 750 to swivel with respect to the lower member 710.

In some embodiments, the lower members described herein can each include a contact surface (for example, the surface 120) that can vary in size, dimensions, and so forth. In some embodiments, the contact surface can be made out of materials including, but not limited to, felt, nylon, steel, rubber, and so forth.

Figure 13:
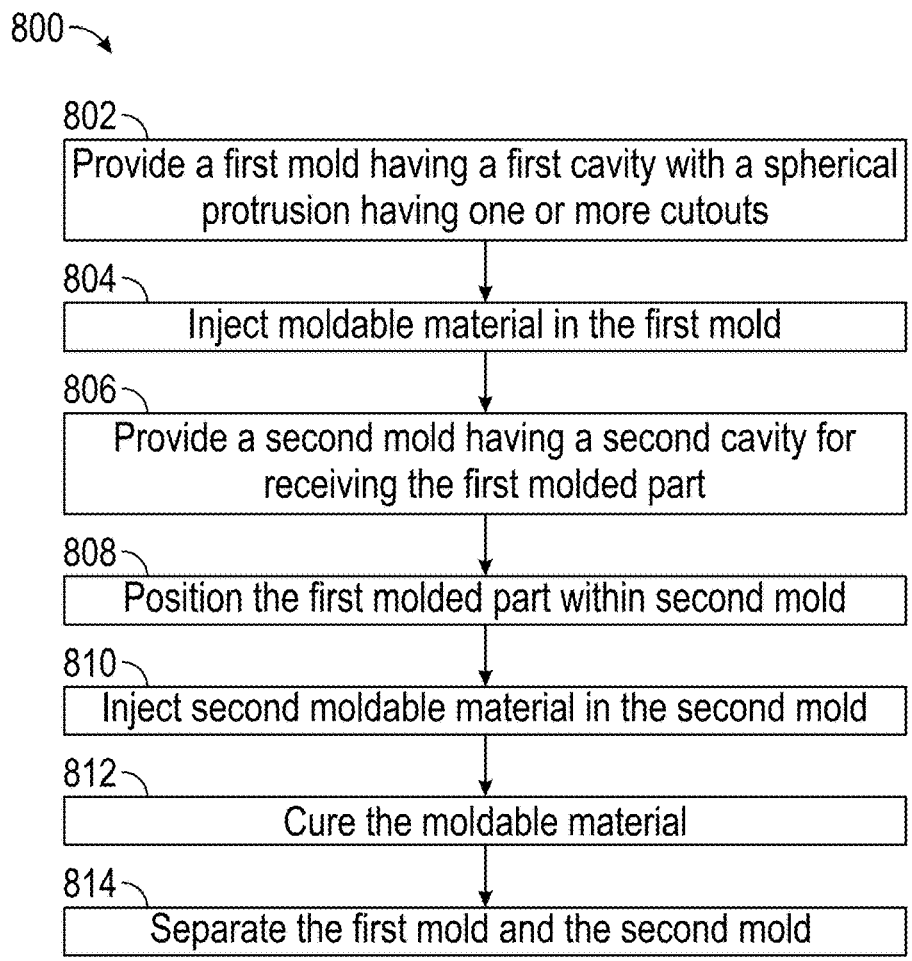
FIG. 13 illustrates an embodiment of a first method of manufacturing a swivel glide.

FIG. 13 illustrates an example flowchart 800 for a two-shot molding manufacturing process for a swivel glide (for example, the swivel glide 100). At block 802, a first mold (for example, the molds 500 and 550 illustrated in FIGS. 5A and 5B) is provided having a first cavity with a spherical protrusion having one or more cutouts. At block 804, a moldable material is injected into the first mold (for example, plastic, polymer, or other suitable material). At block 806, a second mold (for example, the molds 560 and 562) is provided having a second cavity for receiving the first molded part (for example, upper member 150). At block 808, the first mold part is positioned within the second mold (similar to what is illustrated in FIG. 6). At block 810, a second moldable material (for example, plastic, polymer, or other suitable material) injected into the second mold. The second moldable material can be different than the first moldable material used for the first moldable part. At block 812, the moldable material injected in the molds is cured. At block 814, the first mold is separated from the second mold and a cured swivel glide 100 is removed from the molds.

Figure 14:
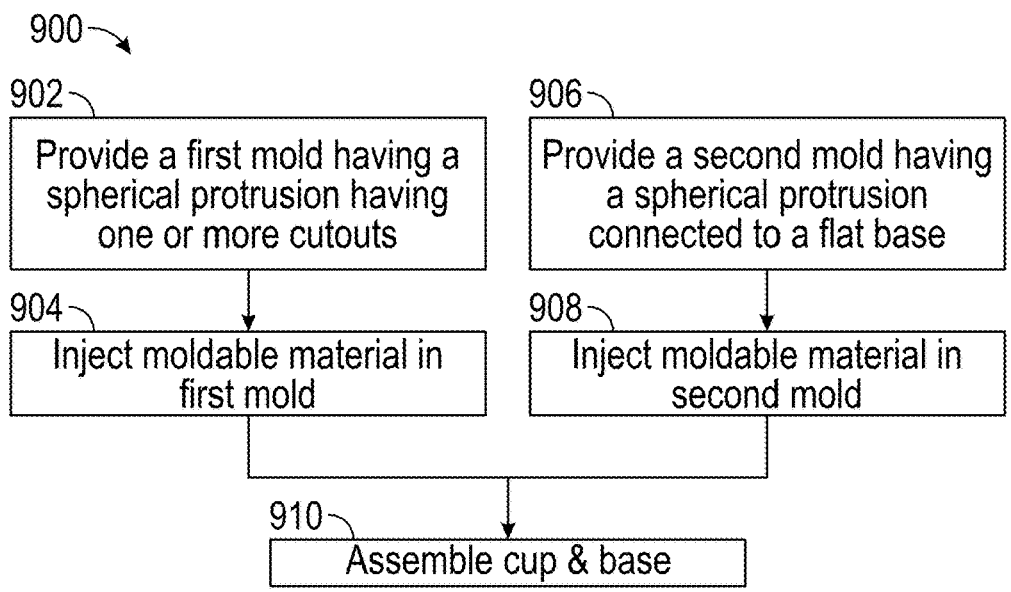
FIG. 14 illustrates a second embodiment of a first method of manufacturing a swivel glide.

FIG. 14 illustrates an example flowchart 900 for manufacturing and assembling process for a swivel glide (for example, the swivel glide 100). At block 902, a first mold (for example, the molds 500 and 550 illustrated in FIGS. 5A and 5B) is provided having a first cavity with a spherical protrusion having one or more cutouts for forming the upper member 150. At block 904, a moldable material is injected into the first mold (for example, plastic, polymer, or other suitable material) and the mold is cured. At block 906, a second mold (for example, the mold 552 illustrated in FIG. 5C) is provided having a second cavity with a spherical protrusion connected to a flat base for forming the lower member 110. At block 908, a second moldable material (for example, plastic, polymer, or other suitable material) injected into the second mold and the mold is cured. The second moldable material can be different than the first moldable material used for the first moldable part. At block 910, the upper member and the lower member are assembled together by hand or using one or more machines to form the swivel glide 100.

Figure 15:
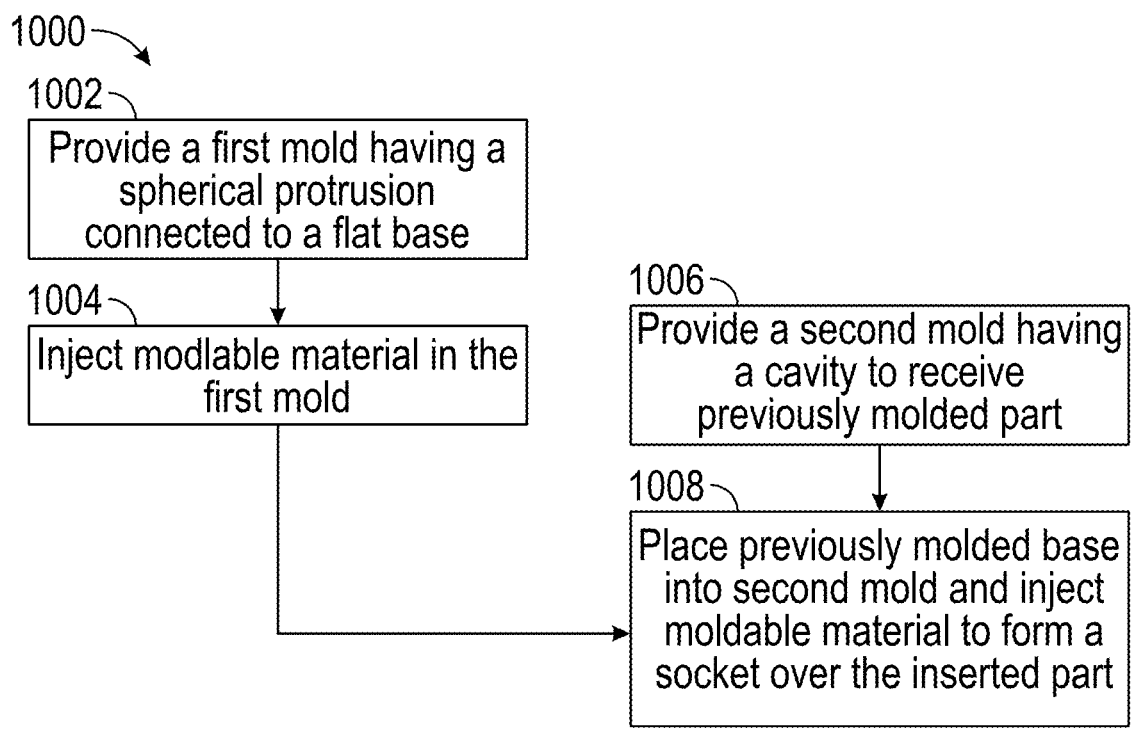
FIG. 15 illustrates a third embodiment of a first method of manufacturing a swivel glide.

FIG. 15 illustrates an example flowchart 1000 for an insert molding manufacturing process for a swivel glide (for example, the swivel glide 100). At block 1002, a first mold (for example, the mold 552 illustrated in FIG. 5C) is provided having a first cavity with a spherical protrusion connected to a flat base for forming the lower member 110. At block 1004, a moldable material is injected into the first mold (for example, plastic, polymer, or other suitable material) and the mold is cured. At block 1006, a second mold (for example, the molds 560 and 562) is provided having a second cavity for receiving the first molded part (such as illustrated in FIG. 6). At block 1008, the first molded part (lower member 110) is positioned within the second mold and a second moldable material (for example, plastic, polymer, or other suitable material) injected into the second mold. The newly molded material forms a socket (upper member 150) over the first molded part (lower member 110). The second mold is separated and a cured swivel glide 100 is removed from the mold.

In some embodiments, the swivel glide may be designed and dimensioned to attached to leg tubes having different thicknesses and different tolerances.

In some embodiments, the swivel glide may accommodate different leg tube diameters.

In some embodiments, an upper member (for example, the upper member 150) of a swivel glide can be of varying shapes, sizes, colors, and/or include various aesthetic features. Optionally, the color of the upper member can be the same as that of a lower member (for example, the lower member 110).

Although injection molding was used as an example manufacturing method for the swivel glides described herein, other methods such as compression molding, 3D printing, and metal injection molding can also be used.

In some embodiments, the socket (for example, the cavity 182) of the ball and socket joint between an upper member (for example, the upper member 150) and a lower member (for example, the lower member 110) can require a minimum retention force to remove the ball 118 of the ball and socket joint. The retention force prevents accidental decoupling between the ball (for example, the ball 118) and the socket (for example, the cavity 182). In some embodiments, the minimum retention force may be between approximately 10 lbs and 50 lbs, which allows users to easily separate the upper member and the lower member while prevents accidental decoupling between the upper member and the lower member during use.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A method of manufacturing at least a portion of a swivel glide, the method comprising:
    providing a first mold, the first mold comprising a first bottom surface, a first top surface, a first cavity, and a spherical protrusion, the spherical protrusion positioned in the first cavity formed on the first top surface, the spherical protrusion comprising a plurality of cutouts formed on an outer surface of the spherical protrusion and extending along at least a portion of a height of the spherical protrusion;
    providing a second mold, the second mold comprising, a second bottom surface, a second top surface, a second cavity, and a plurality of arms;
    positioning the second mold on top of the first mold such that the first top surface of the first mold is abutted against the second bottom surface of the second mold, the plurality of cutouts of the first mold configured to receive the plurality of arms of the second mold when the second mold is positioned on top of the first mold;
    injecting a first moldable material in the first mold to fill the first cavity and the second mold to fill the second cavity while the second mold is positioned on top of the first mold;
    curing the first moldable material within the first mold and the second mold;
    after curing the first moldable material, separating the first mold and the second mold to remove a cured first moldable material from the first mold and the second mold, the cured first moldable material forming an upper member of the swivel glide.

2. The method of claim 1, wherein the spherical protrusion has a shape corresponding to a socket of the upper member of the swivel glide.

3. The method of claim 1, wherein the spherical protrusion extends in a first direction away from the first bottom surface.

4. The method of claim 1, wherein the plurality of arms positioned in the second cavity and extending in a second direction away from the second top surface.

5. The method of claim 1 further comprising:
providing a third mold having a third cavity for receiving the upper member and a fourth cavity for forming a lower member of the swivel glide;
positioning the upper member within the third mold;
injecting a second moldable material into the fourth cavity;
curing the second moldable material together with the upper member in the third cavity to mold the swivel glide;
removing the upper member and the lower member of the swivel glide from the third mold, wherein the upper member is coupled to the lower member, wherein the upper member is configured to swivel with respect to the lower member.

6. The method of claim 5, wherein the first moldable material and the second moldable material are the same.

7. The method of claim 5, wherein the first moldable material and the second moldable material are different.

* * * * *